United States Patent [19]

Beck

[11] Patent Number: 5,259,711
[45] Date of Patent: Nov. 9, 1993

[54] TIE-DOWN APPARATUS

[76] Inventor: George R. Beck, 7 Bridle La., Rancho Palos Verdes, Calif. 90274

[21] Appl. No.: 912,516

[22] Filed: Jul. 13, 1992

[51] Int. Cl.⁵ .............................................. B60P 7/08
[52] U.S. Cl. ..................................... 410/104; 410/101
[58] Field of Search .................................... 410/8–12, 410/74, 75, 101, 104, 105, 106, 107, 108–113, 115, 116, 150

[56] References Cited

U.S. PATENT DOCUMENTS

| | | | |
|---|---|---|---|
| 2,052,914 | 9/1936 | Williams | 410/105 |
| 2,688,504 | 9/1954 | Parker | 410/105 |
| 2,736,272 | 2/1956 | Elsner | 410/105 |
| 3,241,501 | 3/1966 | Watts | 410/105 |
| 3,344,749 | 10/1967 | Bass et al. | 410/105 |
| 4,850,769 | 7/1989 | Matthews | 410/110 X |
| 5,178,346 | 1/1993 | Beroth | 410/104 X |

FOREIGN PATENT DOCUMENTS 1161214 3/1958 France .............................. 410/105

OTHER PUBLICATIONS

Slide-N-Lock Tie Down Sys Brochure; Mobile Tech, Inc. 3501 N. 600 W., Greenfield, Ind. 46140–date unknown.

Primary Examiner—Michael S. Huppert
Assistant Examiner—Stephen T. Gordon
Attorney, Agent, or Firm—Roger A. Marrs

[57] ABSTRACT

A tie-down apparatus is disclosed herein having a composite overlying double track on which a car is slideably carried on the topmost track and securement fasteners carried in the lowermost track secure the double track to a supporting rail or truck bed. The car includes a spring-biased plunger having an enlarged head adapted to ride in the uppermost track during positioning of the car along its linear length and to seat in a selected one of a plurality of notches in the rails of the uppermost track for releasably retaining the car in the selected location. The plunger mounts a rotatable ring latch having a first position bearing against the car to prevent displacement of the plunger head from the selected notch and a second position in alignment with lateral car recesses to permit displacement of the head from the selected notch against spring expansion pressure to free the car for sliding along the track.

4 Claims, 1 Drawing Sheet

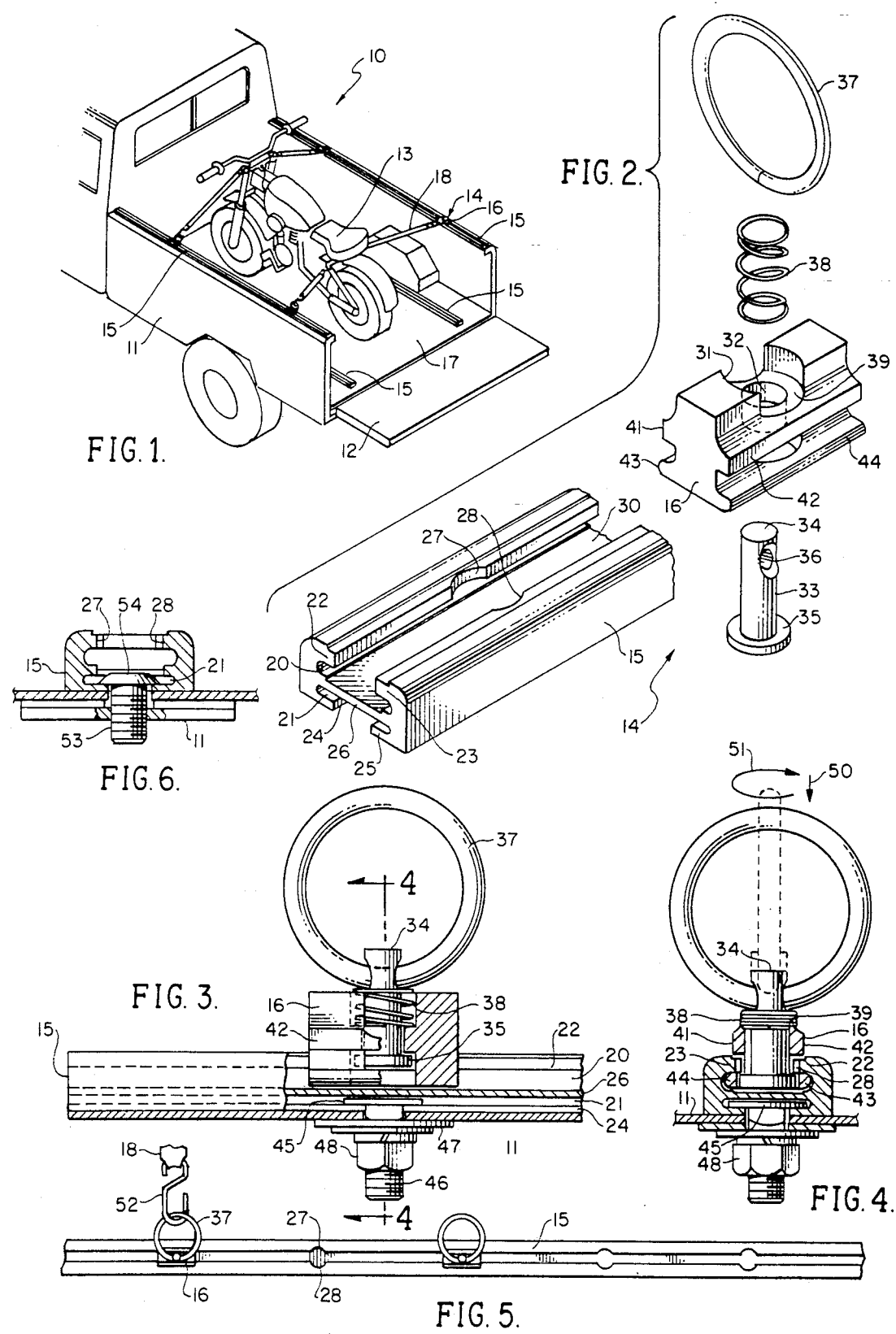

TIE-DOWN APPARATUS

BACKGROUND OF THE INVENTION

1. Field of the Invention

The present invention relates to the field of anchoring devices, and more particularly to a novel tie-down apparatus having a double track arrangement with a slideable car carried on an uppermost track and track securement means carried on the lowermost track for securement to the rail or truck bed. The car includes an operation latch for selectively securing the car in position on the double track.

2. Brief Description of the Prior Art

Conventionally, a wide variety of rings, bars and the like have been provided for retaining the free end of a rope, strap, chain or other securement means along the length of a rail. Such a device usually includes a movable car which slides along the track and in some instances, a plunger is employed which, when aligned with an aperture in the track, permits latching so that the car is retained at that particular place. A typical example resides in the disclosure of U.S. Letters Patent 4,850,769.

However, problems and difficulties have been encountered when employing such a car and track arrangement, which stem largely from the fact that the track itself is of a single or unitary construction not permitting fastening means to be selectively located along the track's length in order to secure the track to a supporting member, such as a truck bed or a truck rail. Usually, holes are provided in the single track through which bolts are passed in order to engage with the supporting structure; however, no provision is made for aligning the securement fasteners at selected anchor positions along its length which would be more suitable than the hole location arranged in fixed spaced-apart relationship along the length of the conventional single track.

Furthermore, the usual latches employed for releasably securing the car to the track sometimes give way and release due to inadvertent shifting of the load which is tied down when the securement straps move, jiggle or become stretched. Also, when changing cargo configurations, oftentimes there is no hook or attached point for securing the cargo.

Therefore, a long-standing need has existed to provide a novel tie-down system or apparatus which employs a sliding lock ring which engages in a track at selective anchoring points, and which allows complete flexibility in accommodating all cargo configurations. Such accommodation includes not only positioning of the car along the track, but in providing selective anchoring points on the track for securement to a support member, such as a rail or truck bed.

SUMMARY OF THE INVENTION

Accordingly, the above problems and difficulties are obviated by the present invention which provides a novel tie-down system employing a double track having an uppermost track carried integrally on top of a lower track and which incorporates a sliding car movably carried on the upper track, having a latch mechanism for releasably engaging with selective ones of spaced-apart notches formed in the upper track. The lower track includes fastener means slideably arranged along its length to desired locations for securement to a supporting truck bed or rail.

A feature resides in the fact that the car latch mechanism includes a ring to which a load may be attached and the ring in the one position bears against the car to prevent release while when rotated 90 degrees to a second position, it permits release of the car from the track.

Another object of the present invention provides for a tie-down apparatus having the ability to accommodate a variety of cargo configurations such that the anchoring means of the track may be specifically located to desired locations along the supporting member as well as having a release mechanism on the car slideably carried on the track which may be placed under load.

Another object of the present invention is to provide a novel and inexpensive anchoring means for securing cargo of various configurations to a truck rail or truck bed that includes a double track wherein one track is for selectively anchoring the track to the supporting member while the other track slideably mounts a movable car having a release mechanism and a strap attachment means.

Yet another object of the present invention is to provide a novel tie-down system incorporating a novel latch mechanism for a slideable car which includes a spring-tensioned plunger prevented from movement by a ring when the ring is in one position and wherein the plunger is in a release position when the ring has been moved to a 90 degree second position.

Another object is to provide a unique device having a plunger and ring combination in a sliding car which adds locking security to the total mechanism when pull pressure or load tension increases.

A further object resides in providing a complete cargo restraint system which is not only ideal for pickup trucks, but adds load flexibility and cargo security to trailers, vans, trucks, or any type of cargo platform.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view showing the novel tie-down apparatus in a typical operational position for holding cargo to a truck bed;

FIG. 2 is an exploded perspective view showing the respective components of the tie-down apparatus used in FIG. 1;

FIG. 3 is a longitudinal cross-sectional view of the tie-down apparatus showing the sliding car in a locked position on the double track;

FIG. 4 is a transverse cross-sectional view of the tie-down apparatus as taken in the direction of arrows 4—4 of FIG. 3 illustrating the latch in a second position permitting release of the plunger for sliding the car along the uppermost part of the track;

FIG. 5 is a reduced top plan view showing the double track arrangement with a pair of cars slideably mounted thereon; and FIG. 6 is a transverse cross-sectional view of another version for anchoring the double track to a supporting member.

DESCRIPTION OF THE PREFERRED EMBODIMENT

Referring to FIG. 1, a conventional truck is illustrated in the general direction of arrow 10 which includes a rear bed 11 having continuous sidewalls terminating in a door 12 shown in a down position. The continuous sidewalls of the bed 11 define a storage compartment or cavity in which boxes, parcels, odd shaped cargo and the like may be stored. In the present instance, numeral 13 indicates a motorcycle which is of irregular configuration, and the motorcycle, as cargo is positioned within the compartment. The motorcycle is intended to be transported by the truck from one place to another. During such transport, the motorcycle 13 will generally move about in the compartment, which is undesirable. Therefore, a means is required for releasably holding or tyinq the motorcycle to the truck bed or other support medium, such as the sidewalls of the compartment, so as to inhibit the undesired movement.

The novel tie-down apparatus or device of the present invention is employed in combination with the truck bed 11 for such a purpose. Other applications and usages may be employed without departing from the inventive concept and such other applications may include a tie-down for block and tackle purposes in connection with other vehicles such as boats, trailers or the like.

In general, numeral 14 illustrates the tie-down means of the present invention which includes an elongated length of double track 15 on which a car 16 is slideably carried. The double track 15 is retained on supporting structure, such as the top of the sidewall of the truck bed 11, by selective anchoring means to be described later. It is important to note that the double track 15 may also be carried on the floor 17 of the bed 11 so that the track may be placed in a more suitable position to tie down cargo of other configurations. In the present instance, the motorcycle 13 is secured to the double tracks located on opposite sides of the truck bed by means of straps, such as strap 18 having its opposite ends detachably secured to the motorcycle itself and the car 16 of the tie-down apparatus.

Referring now in detail to FIG. 2, an enlarged exploded view, in perspective, is provided illustrating the tie-down apparatus 14 and its primary components being the double track 15 in the car 16. The double track 15 is an elongated length of track having an uppermost guide track indicated by numeral 20, and a lowermost guide track indicated by numeral 21. The tracks are arranged on top of one another so as to be in alignment along the length of the track. The uppermost guide track is defined by opposing side rails 22 and 23 while the lowermost guide track is defined by opposing rails 24 and 25. Opposite surfaces of a common central member 26 completes the definition of the respective upper guide track 20 and lower guide track 21. It is also noted that the opposing rails 22 and 23 are provided with a plurality of notches 27 and 28 which are arranged in pairs and spaced along the length of the upper track 20. It is of particular import to note that the central member 26 includes a relief 30 bordered by opposite shoulders for ease of car movement in order to keep debris from being trapped between the car and the track.

Continuing with the description of FIG. 2, it can be seen that the car 16 includes a central recess 31 opening through the top of the car and providing a pair of lateral recesses opening on opposite sides of the car. A central opening 32 accommodates the sliding passage of an elongated shank 33 carried on a plunger 34 with an enlarged flange 35 terminating one end of the shank. The opposite end of the shank includes a hole 36 through which the body of a ring 37 is slideably carried. Initially, the ring 37 is spread apart so as to permit one end of the body to be passed through the opening 36 followed by closure which retains the ring in the opening 36. A compression spring 38 has its opposite ends bearing against the underside of ring 37 and a land 39 surrounding the opening 32.

FIG. 2 also illustrates that the car 16 includes outwardly projecting elements 41 and 42 which define lateral slots on each side of the car in combination with elements 43 and 44. The upper rails 22 and 23 are slideably disposed in the lateral slots defined by the respective elements.

Referring now in detail to FIG. 3, the car 16 is illustrated in its latched position to prevent sliding along the track 15. This is achieved by permitting the expansion of spring 38 to bear against the underside of the ring 37 which is arranged in longitudinal alignment with the longitudinal axis of the track 15. Since the ring 37 passes through the opening 36 of the plunger 34, the plunger is biased upwardly so as to raise the enlarged flange 35 into a selected notch composed of notch pairs 27 and 28. Since the enlarged head 35 resides between the pair of semicircular notches, no movement of the car is permitted. It is important to note that when a load is placed on the ring 37, even further tension is placed to prevent release of the car 16 from the track 15.

Referring further to FIG. 3, it can be seen that the guide track 21 is occupied by a flange 45 carried on the end of a bolt 46. Washers, such as washer 47, are included and a nut 48 is employed for securing the fastener or bolt 46 in place. It is to be understood that when the fastener is loosened, the fastener or bolt may be readily slid through the guide track 21 to any selected or critical location along the length of the double track 15. In this manner, the securement fastener or bolt may be slid along the underside of the track to a desired location such as where an opening or a suitable retention or anchoring location is found on the truck bed floor 17 or on the sidewall, as illustrated in FIG. 1.

Referring now in detail to FIG. 4, the car is shown in its unlatched position wherein the ring 37 has been depressed in the direction of arrow 50 so that the spring 38 is compressed and the plunger 34 has been pushed downwardly from the broken line position to the solid line position so that the enlarged flange 35 is below the semicircular notches 27 and 28 so as to be disposed within the guide track 20. When the enlarged head 35 is in the guide track 20, the car may now be slid from one location to another along the length of the track. Upon the car's reaching a selected notch in the track, the ring 37 is permitted to be biased upwardly due to the expansion of spring 38 which causes the plunger to rise letting the expanded flange 35 enter the selected notch for retention of the car. At this time, the ring 37 can be rotated, as indicated by arrow 51, so that the ring assumes the position shown in FIG. 3 and the car is now latched in retention with the double rail 15.

Regarding FIG. 5, it can be seen that a strap, such as strap 18, may be attached to the ring 37 such as by a conventional S hook 52. When a load is applied to the strap, the load will be carried through the ring, plunger, car, track into the supporting structure. The more load that is placed on the car ensures retention since release requires downward displacement of the ring 37 and the load tension will further augment the bias of spring 38 upwardly.

Referring now in detail to FIG. 6, another version of anchoring means is illustrated wherein the bolt shown in FIGS. 3 and 4 is replaced by a screw fastener 53 which has a shaped head 54 residing or disposed within the guide channel 21. The fastener 53 may be screwed into the supporting structure 11 without the necessity of washers and a nut.

Therefore, in view of the foregoing, it can be seen that an adjustable tie-down system for use in connection with trucks, trailers and vans is provided. The inventive system employs a sliding car 16 which employs an action ring 37 that engages in a track at spaced-apart intervals represented by the spacing of the plurality of notches in the uppermost guide track. This allows for complete flexibility on all cargo configurations. The sliding lock ring incorporated by the ring 37 and car 16 via the plunger 34 cannot be moved when engaged because the force on the ring keeps the plunger and enlarged head 35 engaged in the track relief or notches. The harder the pull, the more secure the engagement becomes. When the ring is turned parallel to the track the insert or enlarged head 35 keeps the ring from being depressed which keeps the assembly engaged in the track. The track is relieved, as indicated by numeral 30, in the bottom of the uppermost guide track for ease of movement and to keep debris from being trapped between the car and the guide track. The lowermost guide slot 21 in the double track allows for two features which are: (1) Holes can be placed anywhere for ease of installation; and (2) Through-holes can be eliminated in the track so that debris, dirt and sand can be pushed out of the track by the car 16 without jamming on the edges or any drill holes or screw heads. The inventive track system of the present invention is provided with suitable adjustments at tie-down points and features smooth sliding lock mechanisms to replace old-fashioned hooks and rings. The tie-down system is designed to secure cargo of any size, shape or location on trailers, trucks, pickup beds or any other platforms. The unique concept allows the user to change cargo configurations and always have a tie-down point available where it is most needed.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A load-bearing cargo tie-down system comprising the combination of:
   an elongated double track having an upper guide track and a lower guide track immediately beneath and parallel with said upper track;
   a movable car carried on said upper guide track;
   latch means operably carried on said movable car adapted to secure and release said car with respect to said upper guide track;
   anchor means movably disposed within said lower guide track for selectively securing said double track to supporting structure;
   said latch means includes a spring-biased plunger having an enlarged flange for travelling in said upper guide track;
   said upper guide track having a plurality of spaced-apart notches selectively engageable by said plunger flange to hold said car in a fixed position; and
   a ring latch carried on said plunger exteriorly of said upper guide track having a first position permitting said plunger flange to travel in said upper guide track and a second position permitting said plunger flange to engage a selected one of said notches to restrain and hold said car secure to said double track.

2. The invention as defined in claim 1 wherein:
   said double track includes a central member separating said upper and lower guide tracks; and
   said central member provided with an elongated clean-out relief immediately under said plunger flange.

3. The invention as defined in claim 2 including:
   an expansion spring disposed about said plunger having one end bearing against said car and its opposite end bearing against said ring latch to forcibly urge said plunger flange out of said upper guide track into said selected one of said plurality of notches.

4. The invention as defined in claim 3 wherein:
   said ring latch is adapted to receive an applied load exerting a force to pull said plunger flange into said selected notch against the expansion of said expansion spring.

* * * * *